United States Patent
Fendt

(10) Patent No.: US 10,926,767 B2
(45) Date of Patent: Feb. 23, 2021

(54) METHOD FOR CARRYING OUT A LANE CHANGE IN A MOTOR VEHICLE

(71) Applicant: Conti Temic microelectronic GmbH, Nuremberg (DE)

(72) Inventor: Günter Anton Fendt, Schrobenhausen (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 310 days.

(21) Appl. No.: 15/783,219

(22) Filed: Oct. 13, 2017

(65) Prior Publication Data

US 2018/0037233 A1    Feb. 8, 2018

Related U.S. Application Data

(63) Continuation of application No. PCT/DE2016/200140, filed on Mar. 15, 2016.

(30) Foreign Application Priority Data

Apr. 30, 2015   (DE) ......................... 102015208007.2

(51) Int. Cl.
*B60W 30/18*   (2012.01)
*G08G 1/16*    (2006.01)
(Continued)

(52) U.S. Cl.
CPC ..... *B60W 30/18163* (2013.01); *G05D 1/0088* (2013.01); *G05D 1/0214* (2013.01);
(Continued)

(58) Field of Classification Search
CPC ........ B60W 30/18163; B60W 2520/10; G05D 1/0088; G05D 1/0214; G08G 1/167
See application file for complete search history.

(56) References Cited

U.S. PATENT DOCUMENTS

2007/0213924 A1*  9/2007  Nagase ............. G01C 21/3658
                                                  701/414
2012/0078500 A1   3/2012  Yamada et al.
(Continued)

FOREIGN PATENT DOCUMENTS

CN    102436763 A    5/2012
DE    102005023185 A1  11/2006
(Continued)

OTHER PUBLICATIONS

European Examination Report dated Jan. 4, 2019 from corresponding European Patent Application No. 16720705.9.
(Continued)

*Primary Examiner* — Michael D Lang

(57) ABSTRACT

A lane change from a lane which is currently being travelled in by the motor vehicle to an adjacent lane is carried out autonomously if a recommendation to change the lane is output by a control device. The recommendation to change from a relatively fast lane to a slower lane is out-put by the control device if (1) a lane change is possible without putting at risk the motor vehicle and/or another vehicle travelling on the slower lane, (2) the motor vehicle is not being prevented from travelling at a predefined speed by another vehicle travelling ahead in the lane which is currently being travelled in, and (3) no other vehicle which is travelling at a higher speed than the speed of the motor vehicle is detected in the slower lane at a specific distance behind the motor vehicle.

17 Claims, 4 Drawing Sheets

(51) Int. Cl.
  G05D 1/00 (2006.01)
  G05D 1/02 (2020.01)
(52) U.S. Cl.
  CPC ......... *G08G 1/167* (2013.01); *B60W 2520/10* (2013.01); *B60W 2554/80* (2020.02); *B60W 2555/60* (2020.02); *B60W 2720/24* (2013.01)

(56) References Cited

U.S. PATENT DOCUMENTS

| | | | |
|---|---|---|---|
| 2012/0296522 | A1 | 11/2012 | Otuka |
| 2013/0184926 | A1* | 7/2013 | Spero .................... B62D 1/28 701/26 |

FOREIGN PATENT DOCUMENTS

| | | |
|---|---|---|
| DE | 102005050662 A1 | 4/2007 |
| DE | 102007033887 A1 | 9/2008 |
| DE | 102013200462 A1 | 7/2013 |
| DE | 102013021337 A1 | 8/2014 |
| JP | 2003025868 A | 1/2003 |
| JP | 2012073925 A | 4/2012 |
| JP | 2012226392 A | 11/2012 |
| WO | 2006122867 A1 | 11/2006 |
| WO | 2014204381 A1 | 12/2014 |
| WO | 2015000547 A1 | 1/2015 |

OTHER PUBLICATIONS

International Search Report and Written Opinion dated Jul. 27, 2016 from corresponding International Patent Application No. PCT/DE2016/200140.
German Office Action dated Oct. 23, 2015 for corresponding German Patent Application No. 10 2015 208 007.2.
Chinese Office Action dated Sep. 27, 2019 for the counterpart Chinese Patent Application No. 201680013794.2.
Japanese Notice of Reasons for Refusal drafted on Apr. 10, 2020 for the counterpart Japanese Patent Application No. 2017-543993.
Chinese Second Office Action dated Jun. 1, 2020 for the counterpart Chinese Patent Application No. 20168001379.2.

* cited by examiner

METHOD FOR CARRYING OUT A LANE CHANGE IN A MOTOR VEHICLE

CROSS REFERENCE TO RELATED APPLICATION

This application claims the benefit of International application No. PCT/DE2016/200140, filed Mar. 15, 2016, which claims priority to German application No. 10 2015 208 007.2, filed Apr. 30, 2015, each of which is hereby incorporated by reference.

TECHNICAL FIELD

The technical field relates generally to a method for determining whether an autonomous lane change should be performed by a motor vehicle.

BACKGROUND

A generic method for carrying out a lane change is known from German patent publication No. 10 2013 021 337 A1. This publication proposes carrying out a lane change from a lane which is currently being travelled on to an adjacent lane autonomously if the vehicle on the lane which is currently being travelled on is prevented from travelling at a predefined speed by a vehicle travelling ahead, and it is possible to travel relatively fast on the adjacent lane. However, in this method, only a change from a slower lane to a relatively fast lane is described.

German patent application No. 10 2013 005 248 A1 also shows a similar concept.

As such, it is desirable to present a method for carrying out a lane change in a motor vehicle which provides possible solutions for changing from a relatively fast lane to a slower lane. In addition, other desirable features and characteristics will become apparent from the subsequent summary and detailed description, and the appended claims, taken in conjunction with the accompanying drawings and this background.

BRIEF SUMMARY

According to one exemplary embodiment of a method described herein, a lane change from a relatively fast lane to a slower lane is carried out if the possibility of putting at risk the vehicle in question and/or putting at risk other road users is excluded, if travelling relatively fast on the relatively fast lane which is currently being travelled on is not desired, and if no motor vehicle is approaching the motor vehicle in question on the slower lane at a higher speed, i.e. if there is no need to fear that the motor vehicle in question is at risk of being overtaken by a motor vehicle on the slower lane.

The solution according to this embodiment increases traffic safety since an autonomous lane change to a slower lane is carried out in compliance with the stipulated criteria so that the relatively fast lane is kept clear better in accordance with the existing obligation to drive on the right-hand side of the road, at least within the area of validity of the German highway code.

In countries where vehicles drive on the right-hand side of the road such as, for example, Germany, the United States of America, and many additional countries, the relatively fast lane means the left lane and the slower lane means the right lane. If there are more than two lanes in one direction on a roadway, the relatively fast lane also means the left of two adjacent lanes. Of course, the method also makes possible a lane change over multiple lanes, wherein the method per se is always carried out for each individual lane change. In countries where vehicles drive on the left-hand side of the road, the relatively fast lane means the right lane respectively and the slower lane means the left lane respectively.

The method according to the invention can primarily be carried out on multi-lane roadways such as interstate highways and federal highways which are similar to interstate highways, but it is also possible to execute the method on multi-lane downtown roads. The application of the method can, if necessary, be controlled as a function of navigation data.

Based on the criteria of the method according to one exemplary embodiment, the vehicle in question would also change from the relatively fast lane to the slower lane in the case of a completely empty roadway.

In one very advantageous aspect of the method, it can be envisaged that the recommendation to change the lane is only output by the control device if, on the slower lane, no other motor vehicle travelling at a speed which is lower by a specific amount than the speed of the motor vehicle in question is detected ahead of the motor vehicle in question. This prevents a lane change being carried out from the relatively fast lane to the slower lane and immediately afterwards a change from the slower lane to the relatively fast lane being required again, as another motor vehicle is located on the slower lane. This results in a steadier quality of driving.

In another advantageous aspect of the method, it can be envisaged that the recommendation to change the lane is only output by the control device if the motor vehicle in question has not reached the prevailing maximum permissible speed for the lane which is currently being travelled on. In this case, it is assumed that a lane change is not required if the prevailing maximum permissible speed is reached such as, for example, in the area of interstate highway construction sites when all lanes are limited to a specific speed. This prevents changing lanes too frequently.

The carrying out of the method may also be restricted if the recommendation to change the lane is only output by the control device if the motor vehicle in question has overtaken another motor vehicle travelling on the slower lane, and no further motor vehicle is detected within a specific distance ahead of the other overtaken motor vehicle. This criterion is an indication that no overtaking maneuver is currently taking place on the slower lane so that the motor vehicle in question can change to the slower lane.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

When referring to the Figures, like numerals indicate like elements throughout the several views.

Figure 1:
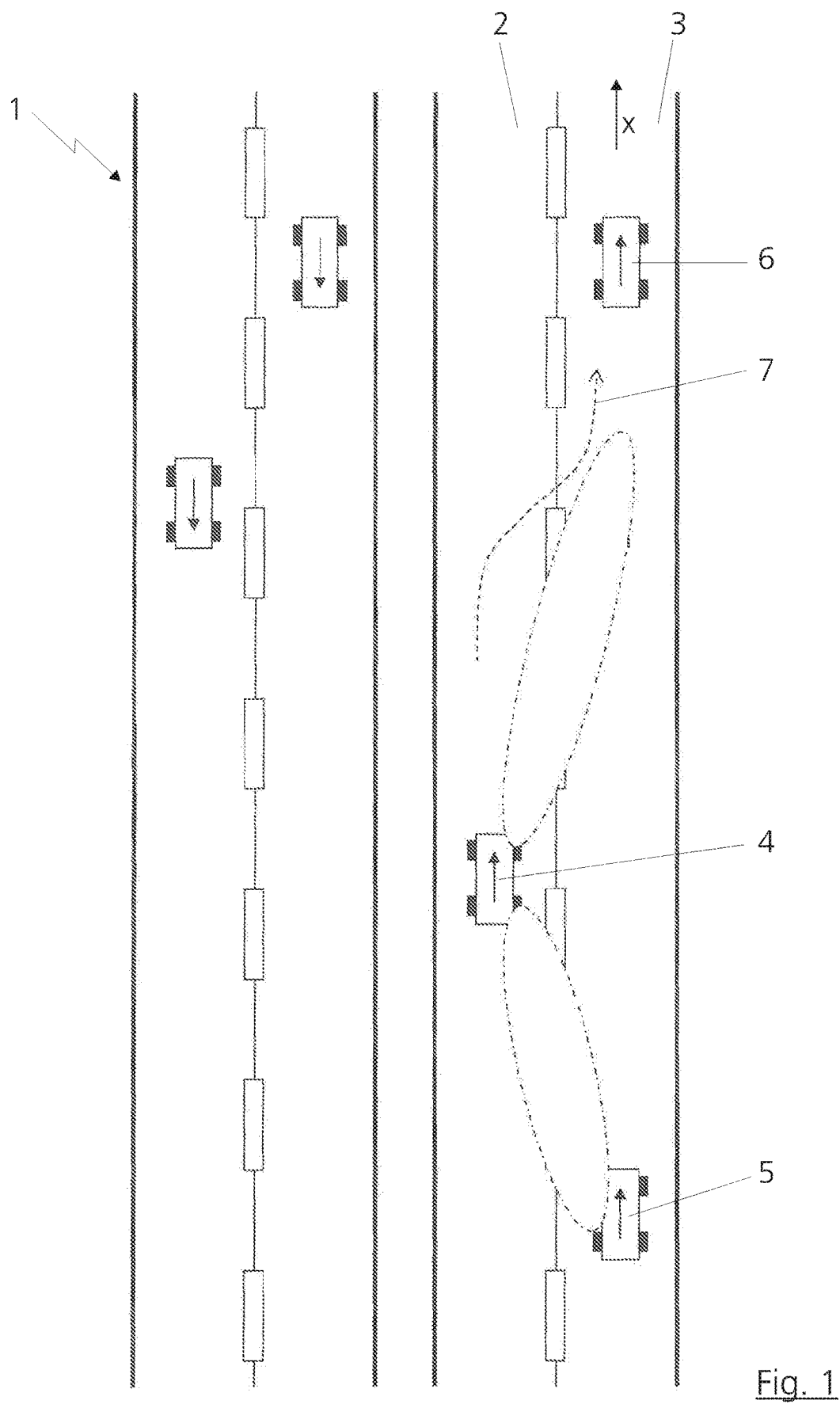
FIG. 1 shows a first situation in which a lane change is executed according to one exemplary embodiment of a method.

FIG. 1 shows a roadway 1, in the present case an interstate highway which has two lanes each for each direction of travel. Only the right half of the roadway 1, on which the motor vehicles are travelling in the direction marked with "X" is relevant for the method described below. The roadway 1 has two lanes, namely a left, relatively fast lane 2 and a right, slower lane 3. In the situation shown in FIG. 1, a motor vehicle 4 in question is travelling on the relatively fast lane 2 at a specific speed. Two other motor vehicles, namely one motor vehicle 5 travelling behind the motor vehicle 4 in question and one motor vehicle 6 travelling ahead of the motor vehicle 4 in question, are travelling on the slower lane 3.

It is assumed in all of the situations described herein that during autonomous driving the speed of the motor vehicle 4 in question is not changed or is only changed very rarely with the accelerator pedal or a similar device, but is predefined by means of a cruise control or another suitable device, so that it is desired by the driver of the motor vehicle 4 in question that the same be moved at a specific speed. This is therefore a predefined speed for the motor vehicle 4 in question.

It is assumed in the situation shown in FIG. 1 that the speed of the motor vehicle 4 in question, which is preferably input via a cruise control or similar device, is approximately the same as the speed of the two motor vehicles 5 and 6. In order for a control device (not shown) of the motor vehicle 4 in question to output a recommendation to change from the relatively fast lane 2 to the slower lane 3, whereupon the motor vehicle 4 in question autonomously changes from the relatively fast lane 2 to the slower lane 3, a lane change should be possible without putting at risk the motor vehicle 4 in question and/or the two motor vehicles 5 and 6 travelling on the slower lane 3, on the lane 2 which is currently being travelled on the motor vehicle 4 in question should not be prevented from travelling at a speed predefined for the motor vehicle 4 in question by another motor vehicle travelling ahead, and on the slower lane 3 no motor vehicle which is travelling at a higher speed than the speed of the motor vehicle 4 in question should be detected at a specific distance behind the motor vehicle 4 in question. This distance can, like all of the other distances which are referred to herein, be established by suitable environment detection sensors which are present on the motor vehicle 4 in question, but which are not shown. Since all of these criteria are fulfilled in the situation in accordance with FIG. 1, the lane change from the relatively fast lane 2 to the slower lane 3 is initiated. This is indicated by the arrow designated with the reference numeral 7.

Figure 2:
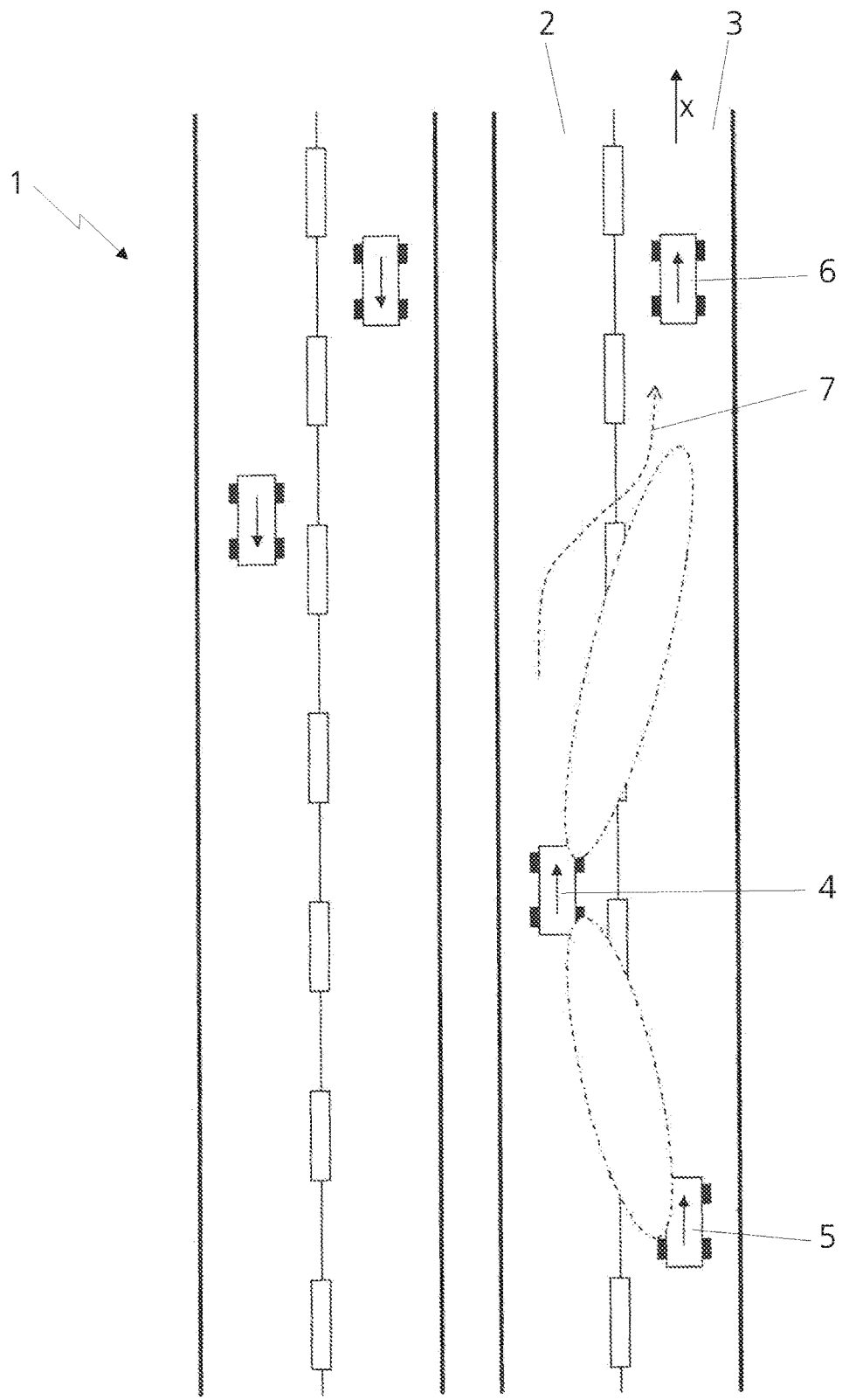
FIG. 2 shows a second situation in which a lane change is executed according to one exemplary embodiment of the method.

FIG. 2 shows a second situation in which a lane change may be carried out according to the method. The motor vehicle 4 in question is, in turn, moving at a specific speed on the relatively fast lane 2. The other two motor vehicles 5 and 6 are travelling on the slower lane 3. In this case, the speed of the motor vehicle 4 in question is indeed greater than the speed of the motor vehicle 5 travelling behind the motor vehicle 4 in question on the slower lane 3, but is approximately equal to or only marginally greater than the speed of the motor vehicle 6 travelling ahead of the motor vehicle 4 in question on the slower lane 3. Therefore, since no further motor vehicle which is travelling at a speed which is substantially lower than the speed of the motor vehicle 4 in question is detected on the slower lane 3, the recommendation to change the lane is output by the control device of the motor vehicle 4 in question and the motor vehicle 4 in question moves, in turn, in accordance with the arrow 7 from the relatively fast lane 2 to the slower lane 3. If, during the further course of its travel, a change from the slower lane 3 to the relatively fast lane 2 is required, for example in order to overtake the motor vehicle 6 travelling ahead of the motor vehicle 4 in question, the lane change then required can be carried out in the known way.

Even if the speed of the motor vehicle 4 in question is not only slightly greater than the speed of the motor vehicle 6 travelling ahead of the motor vehicle 4 in question on the slower lane 3, the change from the relatively fast lane 2 to the slower lane 3 can be executed if the distance of the other motor vehicle 6 from the motor vehicle 4 in question is large enough.

Figure 3:
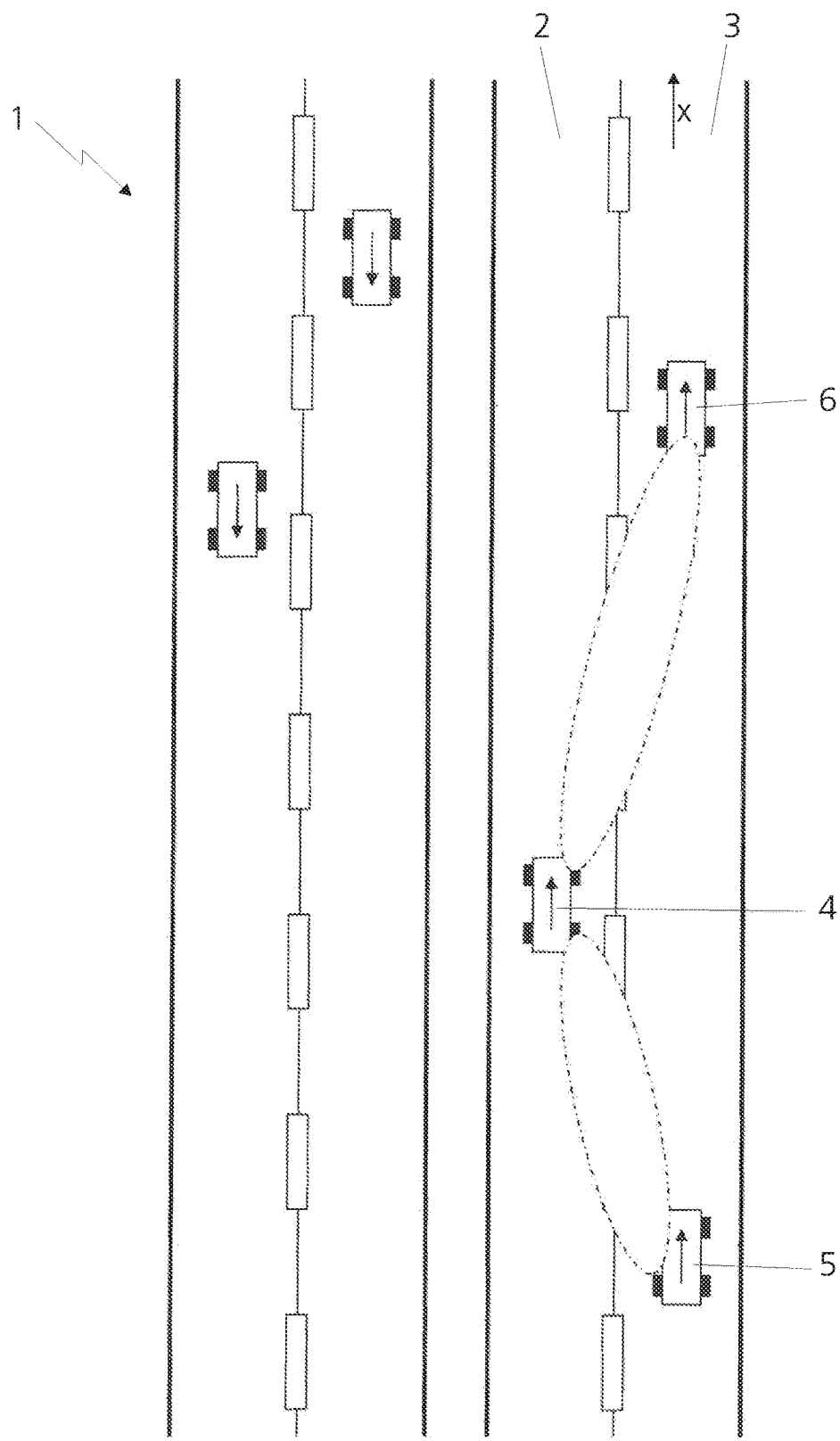
FIG. 3 shows a third situation in which a lane change is not executed according to one exemplary embodiment of the method.

FIG. 3 shows a situation in which a lane change is not carried out. In this case, the speed of the motor vehicle 4 in question, which is in turn moving on the relatively fast lane 2, is greater than the speed of the motor vehicle 5 travelling behind the motor vehicle 4 in question on the slower lane 3, but it is also greater than the speed of the motor vehicle 6 travelling ahead of the motor vehicle 4 in question on the slower lane 3. As a result, the distance from the motor vehicle 6 travelling ahead of the motor vehicle 4 in question on the slower lane 3 is also too small. Since, in this case, in the event of changing from the relatively fast lane 2 to the slower lane 3, a further lane change back to the relatively fast lane 2 would then be required immediately afterwards in order to overtake the other motor vehicle 6, the control de-ice does not output the recommendation to change the lane in this case. Basically, it can be envisaged that the recommendation to change the lane is only output by the control device if, on the slower lane 3, no other motor vehicle which is travelling at a speed which is lower by at least 20 km/h, in another embodiment lower by at least 10 km/h, and in another embodiment lower by at least 5 km/h than the speed of the motor vehicle 4 in question is detected ahead of the motor vehicle 4 in question.

Figure 4:
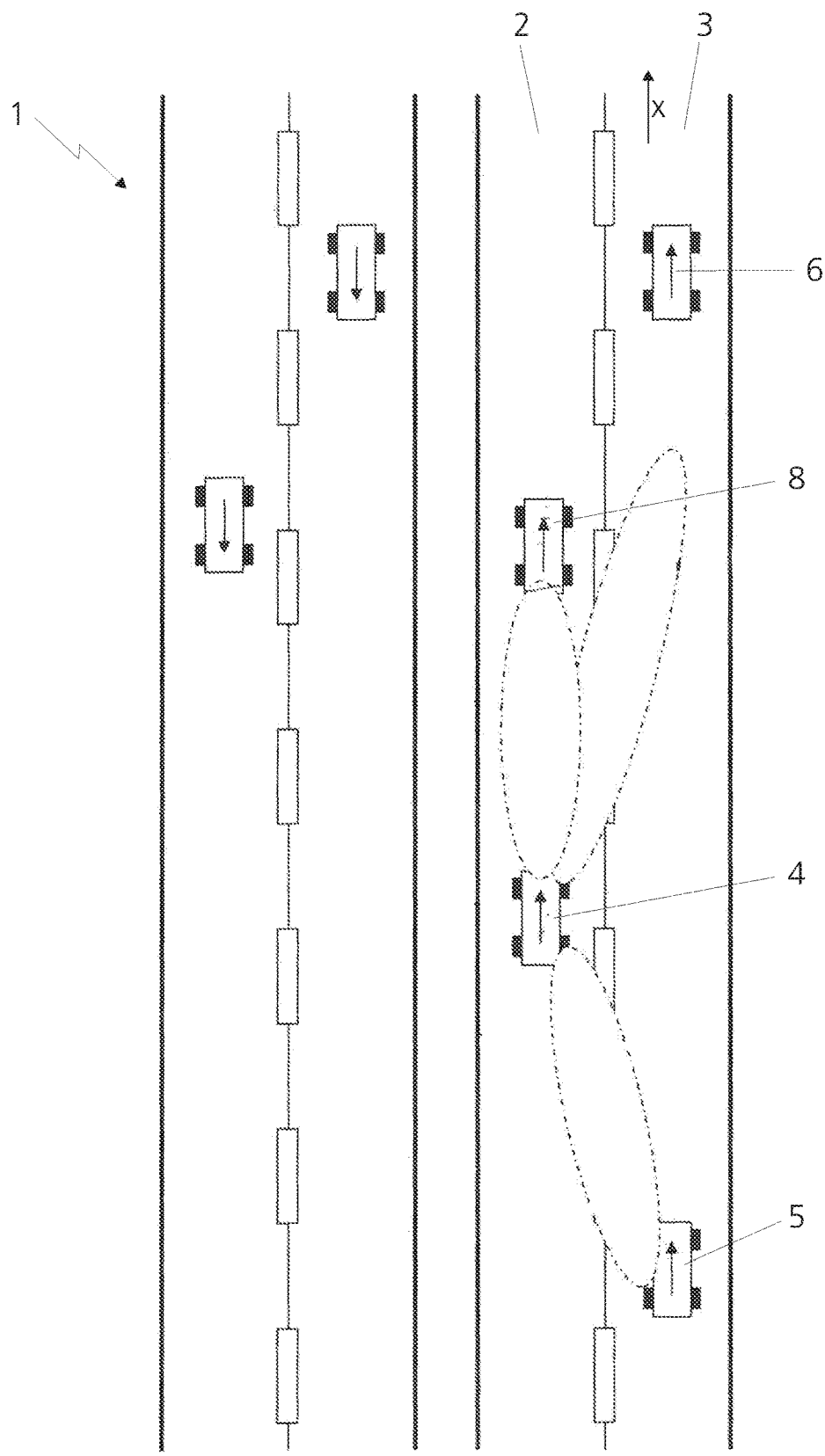
FIG. 4 shows a fourth situation in which a lane change is not executed according to one exemplary embodiment of the method.

FIG. 4 also shows a situation in which the lane change is not executed. The motor vehicle 4 in question is moving on the relatively fast lane 2 at a constant speed which is preferably input via a cruise control or similar device. The two motor vehicles 5 and 6, the speed of which is, however, irrelevant in the present case, are in turn travelling on the slower lane 3. Another motor vehicle 8, the speed of which is equal to or lower than the speed of the motor vehicle 4 in question, is travelling ahead of the motor vehicle 4 in question on the relatively fast lane 2. Since the motor vehicle 4 in question is prevented from travelling at a relatively fast speed by the other motor vehicle 8, the change to the slower lane 3 is not required, which is why the recommendation to change from the relatively fast lane 2 to the slower lane 3 is not output by the control device and the motor vehicle 4 in question remains on the relatively fast lane 2. If the motor vehicle 8 travelling ahead of the motor vehicle 4 in question is moving at a slightly higher speed than the motor vehicle 4 in question, the same distances itself from the motor vehicle 4 in question, and therefore no longer constitutes an obstacle. In this case, the change from the relatively fast lane 2 to the slower lane 3 can be carried out in accordance with the conditions described above, if all of the other necessary criteria are fulfilled.

A situation which is not shown in the figures, in which the lane change is carried out, can also involve the recommendation to change the lane only being output by the control device if the motor vehicle 4 in question has overtaken another motor vehicle travelling on the slower lane and no further motor vehicle is detected within a specific sufficient distance ahead of the other overtaken motor vehicle. For example, this would be the case if, in the situation shown in FIG. 2, in which the motor vehicle 4 in question has overtaken the motor vehicle 5 travelling on the slower lane 3, the motor vehicle 6 were not present. A sufficient distance can, in this case, be a distance which corresponds at least to the actual distance covered in 5 seconds at the speed of the motor vehicle 4 in question.

In principle, it is also possible that the recommendation to change the lane is only output by the control device if the motor vehicle in question has not reached the prevailing maximum permissible speed for the lane which is currently being travelled on, i.e., the relatively fast lane 2.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for carrying out a lane change in a motor vehicle, wherein a change from a lane which is currently being travelled on by the motor vehicle in question at a predefined speed to an adjacent lane is carried out autonomously if a recommendation to change the lane is output by a control device, the recommendation to change from a relatively fast lane to a slower lane is output by the control device if:
   a lane change is possible without putting at risk the motor vehicle in question and/or a motor vehicle travelling on the slower lane,
   on the lane which is currently being travelled on, the motor vehicle in question is not being prevented from travelling at the predefined speed by another motor vehicle travelling ahead, and
   on the slower lane, no motor vehicle travelling at a higher speed than the predefined speed of the motor vehicle in question is detected at a specific distance behind the motor vehicle in question.

2. The method according to claim 1, wherein the recommendation to change the lane is only output by the control device if, on the slower lane, no other motor vehicle travelling at a speed which is lower by a specific amount than the speed of the motor vehicle in question is detected ahead of the motor vehicle in question.

3. The method according to claim 2, wherein the recommendation to change the lane is only output by the control device if, on the slower lane, no other motor vehicle which is travelling at a speed at least 20 km/h lower than the speed of the motor vehicle in question is detected ahead of the motor vehicle in question.

4. The method according to claim 2, wherein the recommendation to change the lane is only output by the control device if, on the slower lane, no other motor vehicle which is travelling at a speed which is at least 10 km/h lower than the speed of the motor vehicle in question is detected ahead of the motor vehicle in question.

5. The method according to claim 2, wherein the recommendation to change the lane is only output by the control device if, on the slower lane, no other motor vehicle which is travelling at a speed which is at least 5 km/h lower than the speed of the motor vehicle in question is detected ahead of the motor vehicle in question.

6. The method according to claim 1, wherein the recommendation to change the lane is only output by the control device if the motor vehicle in question has not reached the prevailing maximum permissible speed for the lane which is currently being travelled on.

7. The method according to claim 1, wherein the recommendation to change the lane is only output by the control device if the motor vehicle in question has overtaken another motor vehicle travelling on the slower lane and no further motor vehicle is detected within a specific distance ahead of the other overtaken motor vehicle.

8. The method according to claim 1, wherein the specific distance is further defined as a distance which corresponds at least to an actual distance travelled in 5 seconds at the predefined speed of the motor vehicle in question.

9. A method of controlling a motor vehicle, comprising:
   generating with a control device a recommendation to change from a relatively fast lane to a slower lane if:
      a lane change is possible without putting at risk the motor vehicle and/or another vehicle travelling on the slower lane,
      the motor vehicle is not being prevented from travelling at a predefined speed by another vehicle travelling ahead in the lane which is currently being travelled in, and
      no other vehicle which is travelling at a higher speed than the predefined speed of the motor vehicle is detected in the slower lane at a specific distance behind the motor vehicle; and
   autonomously changing lanes from the relatively fast lane to the slower lane in response to the recommendation to change lanes being generated.

10. A motor vehicle comprising:
    a control device configured to:
       generate a recommendation to change from a relatively fast lane to a slower lane if:
          a lane change is possible without putting at risk the motor vehicle and/or another vehicle travelling on the slower lane,
          the motor vehicle is not being prevented from travelling at a predefined speed by another vehicle travelling ahead in the lane which is currently being travelled in, and
          no other vehicle which is travelling at a higher speed than the predefined speed of the motor vehicle is detected in the slower lane at a specific distance behind the motor vehicle, and
       autonomously control the motor vehicle to change lanes from the relatively fast lane to the slower lane in response to the recommendation to change lanes being generated.

11. The motor vehicle according to claim 10, wherein the recommendation to change the lane is only output by the control device if, on the slower lane, no other motor vehicle travelling at a speed which is lower by a specific amount than the speed of the motor vehicle in question is detected ahead of the motor vehicle in question.

12. The motor vehicle according to claim 11, wherein the recommendation to change the lane is only output by the control device if, on the slower lane, no other motor vehicle which is travelling at a speed at least 20 km/h lower than the speed of the motor vehicle in question is detected ahead of the motor vehicle in question.

13. The motor vehicle according to claim 11, wherein the recommendation to change the lane is only output by the control device if, on the slower lane, no other motor vehicle which is travelling at a speed which is at least 10 km/h lower than the speed of the motor vehicle in question is detected ahead of the motor vehicle in question.

14. The motor vehicle according to claim 11, wherein the recommendation to change the lane is only output by the control device if, on the slower lane, no other motor vehicle which is travelling at a speed which is at least 5 km/h lower than the speed of the motor vehicle in question is detected ahead of the motor vehicle in question.

15. The motor vehicle according to claim 10, wherein the recommendation to change the lane is only output by the control device if the motor vehicle in question has not reached the prevailing maximum permissible speed for the lane which is currently being travelled on.

16. The motor vehicle according to claim 10, wherein the recommendation to change the lane is only output by the control device if the motor vehicle in question has overtaken another motor vehicle travelling on the slower lane and no further motor vehicle is detected within a specific distance ahead of the other overtaken motor vehicle.

17. The motor vehicle according to claim 10, wherein the specific distance is further defined as a distance which corresponds at least to an actual distance travelled in 5 seconds at the predefined speed of the motor vehicle in question.

\* \* \* \* \*